United States Patent
Dao et al.

(10) Patent No.: US 10,585,307 B2
(45) Date of Patent: Mar. 10, 2020

(54) DISPLAY CONSTRUCT WITH INTEGRATED SWITCHABLE MIRROR AND CORRESPONDING SYSTEMS AND METHODS

(71) Applicant: Motorola Mobility LLC, Chicago, IL (US)

(72) Inventors: Kevin Dao, Skokie, IL (US); Sen Yang, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 295 days.

(21) Appl. No.: 15/085,306

(22) Filed: Mar. 30, 2016

(65) Prior Publication Data

US 2017/0285403 A1  Oct. 5, 2017

(51) Int. Cl.

| | |
|---|---|
| *G02F 1/1335* | (2006.01) |
| *G02F 1/133* | (2006.01) |
| *G02F 1/1333* | (2006.01) |
| *G02F 1/1368* | (2006.01) |
| *G06F 3/041* | (2006.01) |
| *G06F 3/044* | (2006.01) |

(52) U.S. Cl.
CPC ...... *G02F 1/133555* (2013.01); *G02F 1/1368* (2013.01); *G02F 1/13306* (2013.01); *G02F 1/13338* (2013.01); *G02F 1/133514* (2013.01); *G02F 1/133528* (2013.01); *G06F 3/044* (2013.01); *G06F 3/0412* (2013.01); *G02F 2001/133302* (2013.01); *G02F 2001/133541* (2013.01); *G02F 2203/02* (2013.01); *G02F 2203/09* (2013.01)

(58) Field of Classification Search
CPC combination set(s) only.
See application file for complete search history.

(56) References Cited

U.S. PATENT DOCUMENTS

| | | | |
|---|---|---|---|
| 7,864,270 B2 | 1/2011 | Zhuang et al. | |
| 8,040,475 B2 | 10/2011 | Ishikawa et al. | |
| 8,957,863 B2 | 2/2015 | Polak et al. | |
| 2002/0171794 A1 | 11/2002 | Nakamura et al. | |
| 2004/0021809 A1* | 2/2004 | Sumiyoshi ............ | G02F 1/1334 349/113 |
| 2004/0257499 A1* | 12/2004 | Yueh ................. | G02F 1/133514 349/106 |

(Continued)

FOREIGN PATENT DOCUMENTS

| | | |
|---|---|---|
| CN | 102411225 | 2/2015 |
| EP | 1312972 | 5/2003 |
| JP | 2000122059 | 4/2000 |

OTHER PUBLICATIONS

James, Gareth , "Exam and Search Report", GB Application No. GB1704066.8; dated Sep. 15, 2017.

*Primary Examiner* — Lauren Nguyen
(74) *Attorney, Agent, or Firm* — Philip H. Burrus, IV (57) ABSTRACT

A display device includes a liquid crystal display operable to selectively transmit light. The display device also includes a switchable mirror that is operable to switch from a pellucid state to a reflective state. The liquid crystal display includes a liquid crystal layer disposed between a first substrate and a second substrate. To preserve color integrity, a color filter and a switchable mirror is also disposed between the first substrate and the second substrate.

18 Claims, 7 Drawing Sheets

(56) References Cited

U.S. PATENT DOCUMENTS

2006/0203154 A1* 9/2006 Uchida ............. G02F 1/133553
   349/114
2008/0252833 A1 10/2008 Nieuwkerk et al.
2010/0134863 A1 6/2010 Kim
2014/0268351 A1 9/2014 VanderPloeg et al.

* cited by examiner

DISPLAY CONSTRUCT WITH INTEGRATED SWITCHABLE MIRROR AND CORRESPONDING SYSTEMS AND METHODS

BACKGROUND

Technical Field

This disclosure relates generally to electronic devices, and more particularly to electronic devices employing displays.

Background Art

Intelligent portable electronic devices, such as smartphones and tablet computers are becoming increasingly powerful computational tools, and as a result, are becoming more prevalent in today's society. While only a few years ago a mobile telephone was a simplistic device that only made telephone calls, today's "smart" devices not only make telephone calls, but also manage address books, maintain calendars, play music and videos, display pictures, and allow users surf the web.

As the capabilities of these electronic devices have progressed, so too have their user interfaces. Physical keypads having a limited number of keys have given way to sophisticated user input devices such as touch sensitive displays. Sometimes, these touch sensitive displays can be difficult to see in all lighting conditions. A particular display that is easily visible in low-light conditions, for instance, may be difficult to see in the sun. While prior art attempts at making transflective displays have been made, they suffer from "washed out" colors in bright light conditions. It would be advantageous to have an improved display for use with electronic devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to a display construct employing a switchable mirror between two substrates of a display. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of transforming a display device having a switchable mirror integrated between substrates of a liquid crystal display layer between a pellucid state and a reflective state described herein. The non-processor circuits may include, but are not limited to, a radio receiver, a radio transmitter, signal drivers, clock circuits, power source circuits, and user input devices. As such, these functions may be interpreted as steps of a method to perform control operations of a display device comprising a liquid crystal display and a switchable mirror, where the switchable mirror is disposed between the first substrate and the second substrate of the liquid crystal display. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a display device comprising a liquid crystal display that is operable to selectively transmit light in response to one or more processors. In one or more embodiments, the display device further comprises a switchable mirror that is operable to switch from a pellucid state to a reflective state. In one or more embodiments, the liquid crystal display comprises a liquid crystal layer disposed between a first substrate and a second substrate. So as to form a singular construct, in one or more embodiments the switchable mirror is also disposed between the first substrate and the second substrate. This is in contrast to prior art transflective display designs where transflective materials are disposed outside, e.g., above or below, the liquid crystal display. The unitary display construct offered by embodiments of the present disclosure offers distinct advantages over prior art display assemblies where, for example, a liquid crystal display is placed above or below a transflective layer.

Generally speaking, there are three types of prior art displays: a transmissive type, a reflective type, and a transflective type. With the transmissive type, a backlight transmits light through a liquid crystal layer to present information to a user. While such displays work well in low and ambient light environments, they are difficult to see in bright light such as full sun environments. By contrast, reflective type displays reflect ambient light off of a reflective device to the user's eyes. While these displays work well in bright light, they can be difficult to see in low light conditions.

As a result of these challenges, designers have attempted to create transflective displays that employ a backlight and a transflector disposed below a liquid crystal display module. The problem with these prior art designs is twofold: First, in some cases the transmissive portions of each pixel and the reflective portions of each pixel are placed in different locations. This reduces the effective surface area of either the reflective portions or transmissive portions by half. Moreover, it can sometimes require six color elements for each pixel rather than the traditional three, i.e., a single red, green, and blue color element.

The bigger problem occurs when these prior art devices are operating in the reflective mode. Since the mechanical "stack up" height of these prior art devices is quite large, the colors become distorted and washed out when operating in the reflective mode. Light received from a green pixel element, for example, can be reflected through a blue or red pixel element. This distorts and homogenizes the colors, making images in the reflective mode appear odd and disturbing.

Embodiments of the present disclosure, by contrast, provide a single, unitary liquid crystal display construct where the liquid crystal layer, color filters, and a switchable mirror are all disposed between the substrates of the liquid crystal display. This greatly reduces, for example, the distance between the color filter and the switchable mirror, allowing light received through a predefined color element of a pixel to be reflected through the selfsame color element from which light was received. Illustrating by example, where a first substrate of the display device construct is to transmit light within an optic cone defined by a predefined minimum angle of incidence, in one or more embodiments wherein an area of a conic section of the optic cone taken at any one colored pixel element is less than the area of the colored pixel element, thereby ensuring that red pixels appear red, blue appear blue, and so forth.

Advantageously, embodiments of the disclosure provide a display device construct that allows for independent mode switching between a transmissive mode of operation and a reflective mode of operation, thereby providing a display that is suitable for many types of portable electronic devices including wearable devices such as smart watches, fitness trackers, and other devices. Embodiments of the disclosure provide a display device construct that provides exceptional color and contrast performance in the transmissive mode, while also providing excellent ambient light visibility when operating in the reflective mode, e.g., when the display is outside in full sun. At the same time, embodiments of the disclosure provide a display device that consumes very little power when operating in the reflective mode.

In one or more embodiments, a display, operable with one or more processors, comprises one or more substrates consisting essentially of a first glass substrate and a second glass substrate of a liquid crystal display module. In one embodiment, a color filter and a switchable mirror are disposed between the first glass substrate and the second glass substrate. The switchable mirror is then operable with the one or more processors to selectively transition between a pellucid state and a reflective state such that the display device can operate either in a transmissive mode or a reflective mode, respectively.

In one embodiment, when an electronic device employing the display is operating indoors, or alternatively when a full-color display is desired, the one or more processors cause the switchable mirror to enter the pellucid state. A backlight, operable with the one or more processors, projects light through the display construct in a normal transmissive mode of operation. By contrast, when the electronic device is outdoors or a reflective mode of operation is desired, the one or more processors transition the switchable mirror to the reflective state. In one or more embodiments, the one or more processors switch the backlight to a low power or OFF mode when this occurs. The switchable mirror then reflects received light through the liquid crystal layer and the color filter to present information on the display. As noted above, in one embodiment the switchable mirror is operable to, when in the reflective state, reflect light through a selfsame colored pixel from which the light was received.

While in one or more embodiments the switchable mirror is disposed between the substrates of the liquid crystal display, there are several different ways in which the display device construct can be manufactured. For example, in one embodiment the switchable mirror is integrated into the open aperture of the area of each pixel of the liquid crystal display layer. In another embodiment, the switchable mirror is disposed along the glass substrate of the liquid crystal display, under the thin film transistor circuits responsible for operating the liquid crystal display layer. Illustrating by example, the switchable mirror is attached to a glass substrate of the liquid crystal display. The thin film transistor layer can then be disposed along the top of the switchable mirror. Other manufacturing techniques will be illustrated with reference to the figures below. Still others will be obvious to those of ordinary skill in the art having the benefit of this disclosure.

Figure 1:
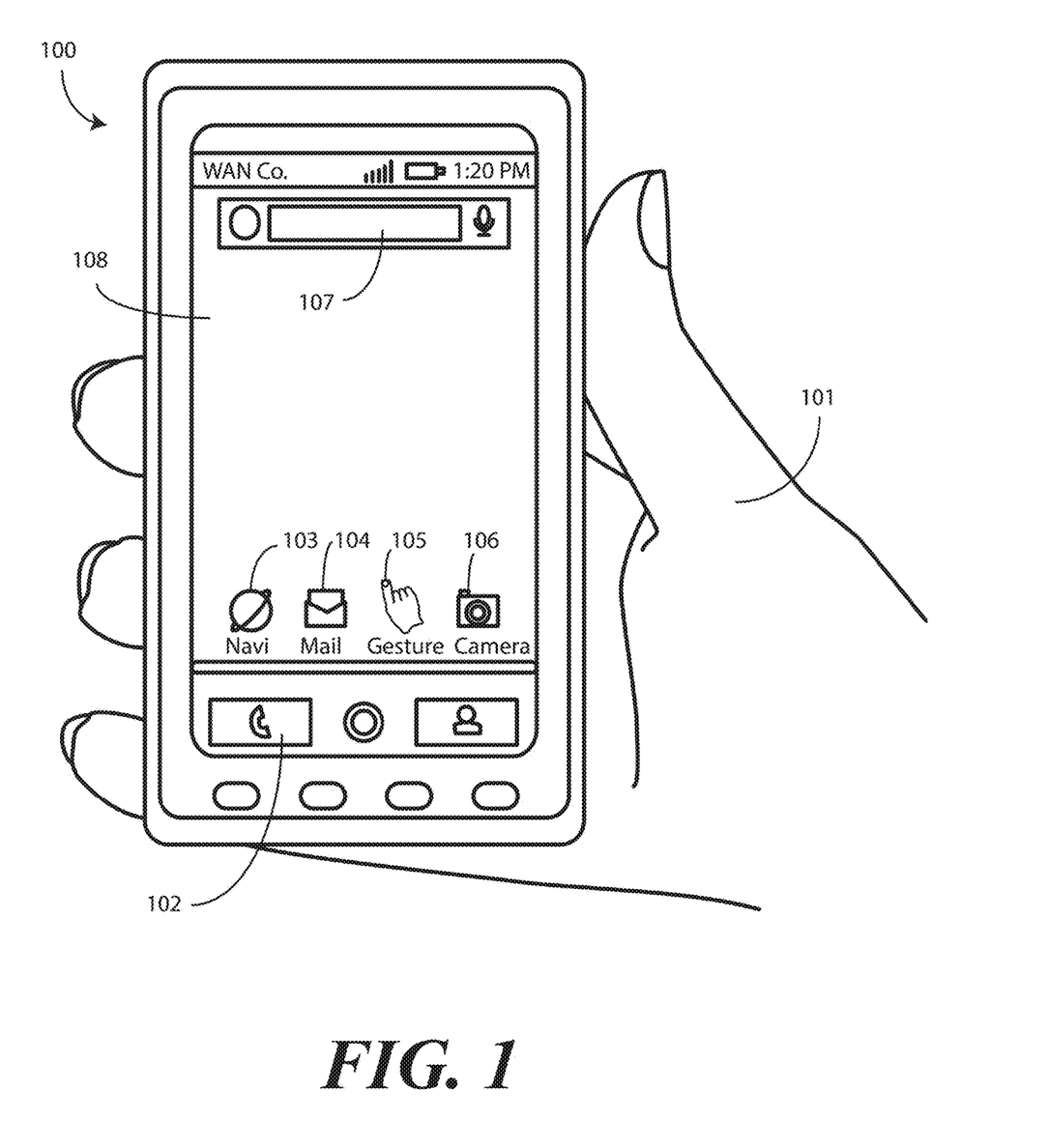
FIG. 1 illustrates one explanatory electronic device in accordance with one or more embodiments of the disclosure.

Turning now to FIG. 1, illustrated therein is one embodiment of an electronic device 100 configured in accordance with one or more embodiments of the disclosure. The explanatory electronic device 100 of FIG. 1 is shown as a smart phone for illustrative purposes. However, it will be obvious to those of ordinary skill in the art having the benefit of this disclosure that other electronic devices may be substituted for the explanatory smart phone of FIG. 1. For example, the electronic device 100 may be configured as a palm-top computer, a tablet computer, a gaming device, wearable computer, a media player, or other device.

A user 101 is holding the electronic device 100. The operating system environment, which is configured as executable code operating on one or more processors or control circuits of the electronic device 100, has associated therewith various applications or "apps." Examples of such applications shown in FIG. 1 include a cellular telephone application 102 for making voice telephone calls, a navigation application 103 configured to provide mapping and navigation information to the user on the display device 108 of the electronic device 100, an electronic mail application 104 configured to send and receive electronic mail, a gesturing application 105 is operable to detect gestures of the user 101 as user input, and a camera application 106 configured to capture still (and optionally video) images. An Internet and/or local search application 107 is also provided. The Internet and/or local search application 107 allows a user to search the web or the local device for items like contacts, lists, songs, media, desirous information on persons, places, and things, and so forth. These applications are illustrative only, as others will be obvious to one of ordinary skill in the art having the benefit of this disclosure.

In one or more embodiments, a display device 108 serves as a primary user interface of the electronic device 100. As will be described in more detail with reference to FIGS. 4-6 below, in one or more embodiments the display device 108 comprises a switchable mirror disposed between a front substrate and a rear substrate of a liquid crystal display. The display device 108 can also include a color filter disposed between the front substrate and the rear substrate of the liquid crystal display. One or more processors of the electronic device 100 can then be operable to switch the switchable mirror from a pellucid state to a reflective state, thereby reflecting light received from a colored pixel of the color filter through the colored pixel—due to the close proximity of the switchable mirror and the color filter between the substrates of the liquid crystal display—to provide a full-color display operable in both a transmissive mode and a reflective mode without washed out colors.

Figure 2:
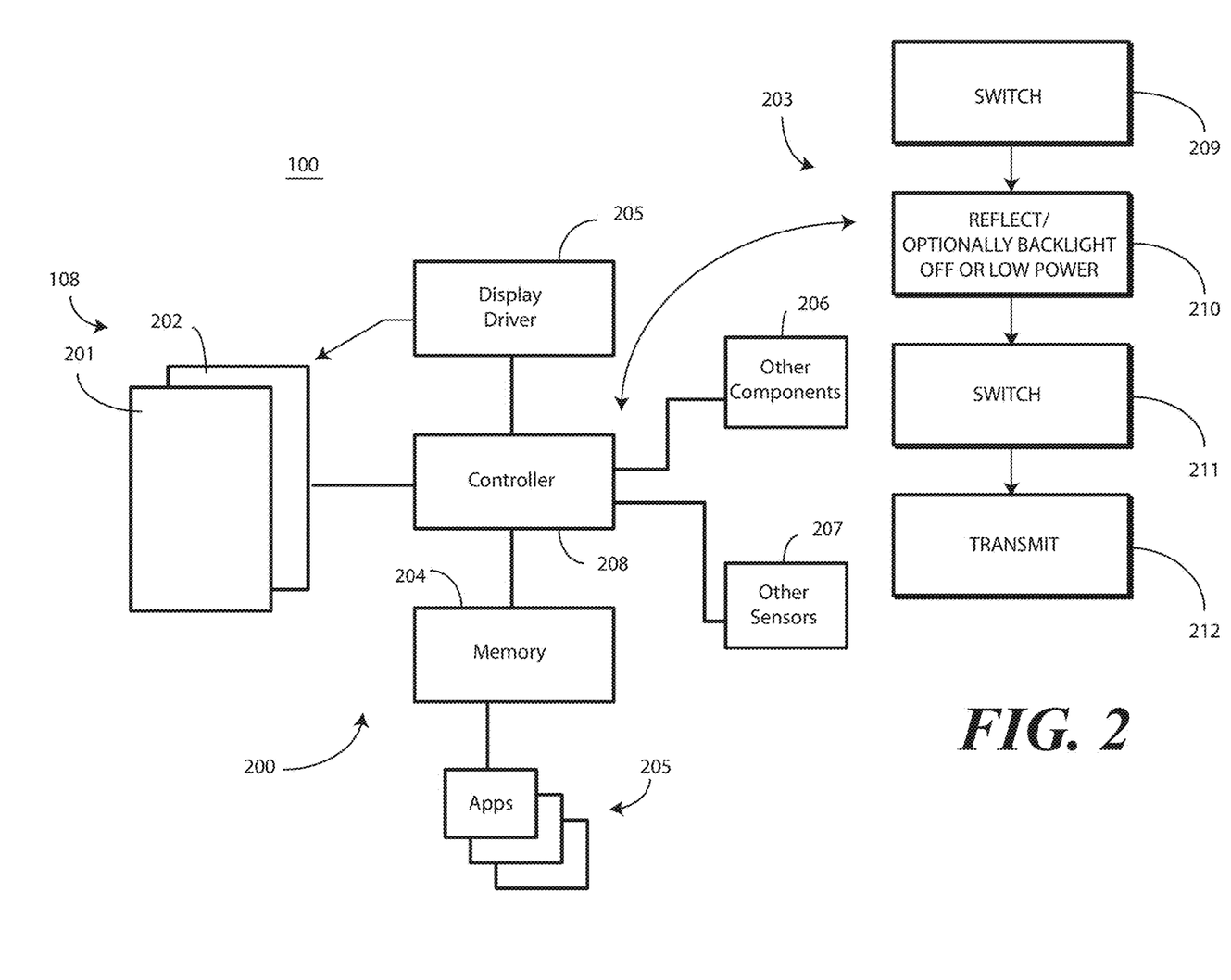
FIG. 2 illustrates a schematic block diagram of one explanatory electronic device in accordance with one or more embodiments of the disclosure.

Turning now to FIG. 2, illustrated therein are various components of one explanatory electronic device 100 configured in accordance with embodiments of the disclosure, with those components shown as a schematic block diagram 200. The schematic block diagram 200 illustrates one embodiment of internal circuitry, software modules, firmware modules, and other components in an electronic device 100 in accordance with embodiments of the disclosure. While this illustrative internal circuitry is directed to a generic electronic device, note that it could be readily adapted to any number of specific devices.

As shown in the schematic block diagram 200, one or more processors 208 are operable with a display device 108. In one embodiment, the display device 108 includes a fascia 201 and a display construct 202. In one or more embodiments, the display construct 202 comprises a unitary, singular device disposed between two substrates, which are generally glass substrates. Accordingly, rather than being multiple, separate devices that are stacked together within the electronic device 100, in one or more embodiments the display construct 202 is a singular device with a front major face defined by a first glass substrate and a rear major face defined by a second glass substrate.

In one or more embodiments, the display construct 202 comprises a liquid crystal layer and a switchable mirror, each of which is disposed between the substrates. For example, in one embodiment the display construct 202 can be configured as a liquid crystal display with an integrated switchable mirror. Said differently, in one embodiment the liquid crystal display comprises a liquid crystal layer disposed between a first substrate and a second substrate. The switchable mirror is then also disposed between the first substrate and the second substrate of the liquid crystal display. Thus, a unitary, singular device can function in the transmissive and reflexive modes as will be described in more detail below.

The one or more processors 208 can comprise a microprocessor, programmable logic, application specific integrated circuit device, or other similar device, and is capable of executing program instructions, such as those shown in method 203. The program instructions may be stored either in the one or more processors 208, or in a memory 204 or other computer readable medium operable with the one or more processors 208. The memory 204 can also store executable code corresponding to the various applications 213 that are operable on the electronic device 100, such as those described above with reference to FIG. 1.

The one or more processors 208 are configured, in one embodiment, to operate the various functions of the electronic device 100. The one or more processors 208 can execute software or firmware applications stored in memory 204 to provide device functionality. A display driver 205 can be included to effect and control presentation of information on the display device 108. In one embodiment, the one or more processors 208 can be responsible for performing the primary functions of the electronic device 100. For example, in one embodiment the one or more processors 208 comprise one or more circuits operable with one or more user interface devices, which can include the display device 108 and the display driver 205, to present, images, video, or other presentation information to a user. The executable software code used by the one or more processors 208 can be configured as one or more modules that store instructions, control algorithms, logic steps, and so forth.

In one or more embodiments, the one or more processors 208 can be operable with the various components of the electronic device 100, including the other components 206 and other sensors 207 shown in FIG. 2, to execute methods 203 in accordance with one or more embodiments of the disclosure. Illustrating by example, in one embodiment the one or more processors 208 can, at step 209 switch the switchable mirror disposed between the front substrate and the rear substrate of the display construct 202 from a pellucid state to a reflective state. At step 210, the method 203 can include reflecting light received from a colored pixel of a color filter disposed between the front substrate and the rear substrate of the display construct 202 off the switchable mirror through the colored pixel from which it was received. Accordingly, when the one or more processors 208 cause the execution of steps 209 and 210, the display device 108 operates in a reflective mode.

At step 211, the method 203 can include switching the switchable mirror of the display construct 202 from the reflective state to a pellucid state. At step 212, the method 203 can include transmitting light from a backlight through the switchable mirror of the display construct 202. Accordingly, when the one or more processors 208 cause the execution of steps 211 and 212, the display device 108 operates in a transmissive mode. The reflective and transmissive modes will be described in more detail below with reference to FIGS. 7-10.

In one embodiment, the other components 206 comprise a communication circuit that can be configured for wired or wireless communication with one or more other devices or networks. The networks can include a wide area network, a local area network, and/or personal area network. The communication circuit may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit can include wireless communication circuitry, one of a receiver, a transmitter, or transceiver, and one or more antennas.

The other components 206 can also include output components such as video outputs, audio outputs, and/or mechanical outputs. Examples of output components include audio outputs or other alarms and/or buzzers and/or a mechanical output component such as vibrating or motion-based mechanisms. Still other components will be obvious to those of ordinary skill in the art having the benefit of this disclosure.

The one or more other sensors 207 may include a microphone or user interface components such as buttons disposed along the electronic device 100 or user actuation targets presented along the display device 108. The other sensors 109 may also include key selection sensors, proximity sensors, a touch pad sensor, a touch screen sensor, a capacitive touch sensor, and one or more switches. Touch sensors may used to indicate whether any of the user actuation targets present on the display device 108 are being actuated. Alternatively, touch sensors disposed in the housing of the electronic device can be used to determine whether the electronic device 100 is being touched at side edges or major faces. The touch sensors can include surface and/or housing capacitive sensors in one embodiment. The other sensors 207 can also include audio sensors and video sensors (such as a camera). The other sensors 207 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary.

It is to be understood that FIGS. 1-2 are provided for illustrative purposes only and for illustrating components of one electronic device 100 in accordance with embodiments of the disclosure, and is not intended to provide a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
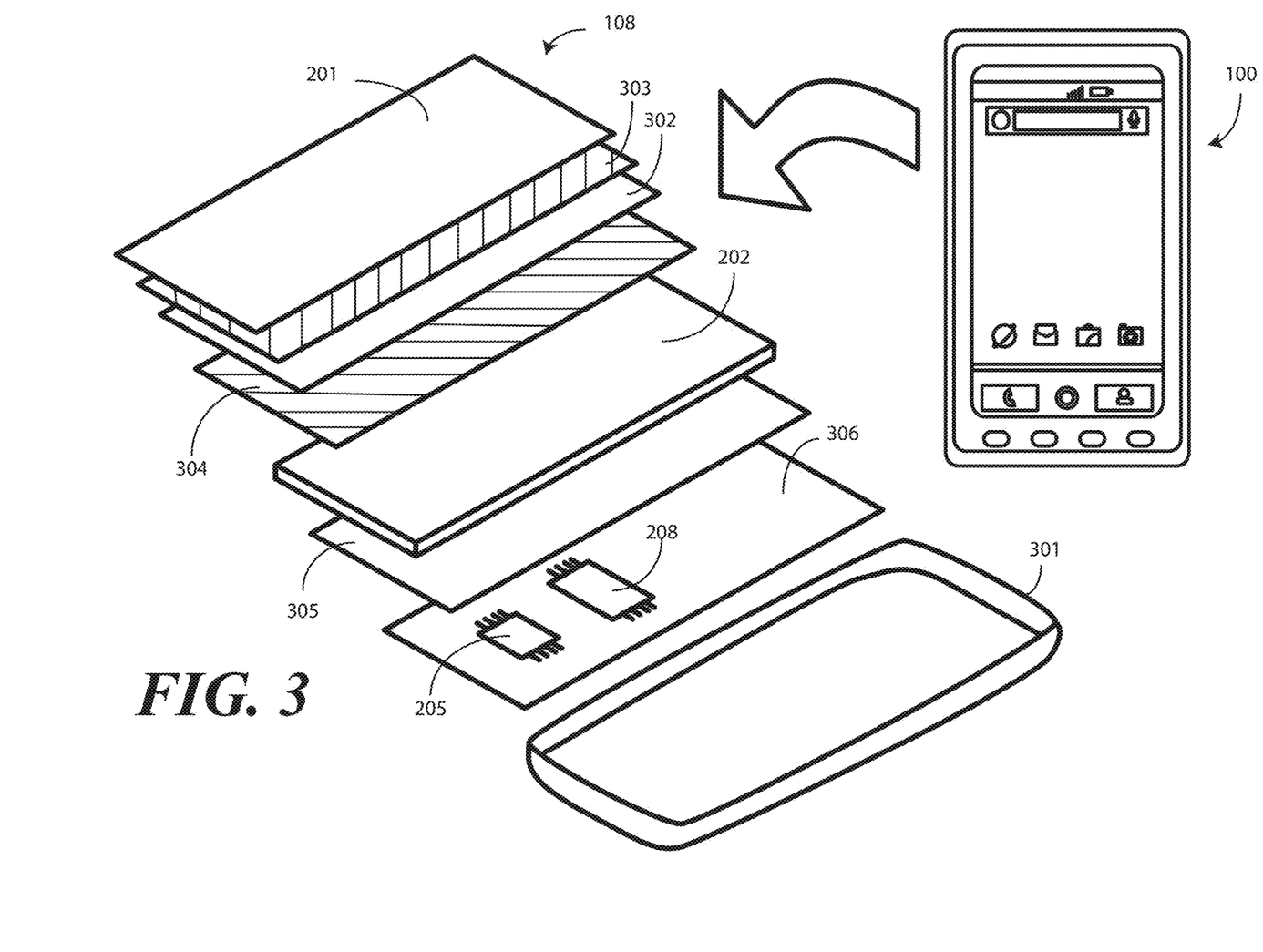
FIG. 3 illustrates an exploded view of one explanatory electronic device in accordance with one or more embodiments of the disclosure.

Turning now to FIG. 3, illustrated therein illustrated therein is an exploded view of one embodiment of the electronic device 100. Some of the elements shown in FIG. 3 will be explained in further detail with reference to subsequent figures. However, FIG. 3 provides an exploded view to illustrate one explanatory mechanical "stack-up" of how the elements can be arranged within a housing 301 in one embodiment.

In this illustrative embodiment, the electronic device 100 includes the display device 108, which includes the fascia 201 and the display construct 202. In one embodiment, the display device 108 is configured to be touch-sensitive so as to receive user input in the form of touch. For example, the display device can include an optional capacitive touch sensor to provide its touch-sensing function where that functionality is included. However, it will be clear to those of ordinary skill in the art having the benefit of this disclosure that touch sensing technologies other than capacitive technologies can be substituted as well.

Starting from the top of the electronic device 100, the fascia 201 defines a front major face of the electronic device. As used herein, a "fascia" is a covering, which may or may not be detachable, for an electronic device. In one or more embodiments, the fascia 201 spans at least a portion of the electronic device 100. In one embodiment, the fascia member will span a major face—or a portion thereof—of the electronic device 100. The fascia 201 may include a ultraviolet barrier. Such a barrier is useful both in improving the visibility of the display construct 202 and in protecting internal components of the electronic device 100.

Where the display device 108 is touch sensitive, the electronic device 100 can next comprise an optional capacitive touch sensor 302. The capacitive touch sensor 302 is operable with one or more processors 208 of the electronic device 100 to detect the position at which a user's finger or stylus makes contact with the fascia 201. In this illustrative embodiment, the capacitive touch sensor 302 functions as a touch sensitive user interface that is disposed beneath substantially the entire fascia 201 such that touch input can be received along substantially the entirety of the fascia 201. However, in other embodiments, the capacitive touch sensor 302 may be disposed along only a portion of the fascia 201, such as within a predefined user interface region that does not span the entirety of the fascia 201. In still other embodiments, the capacitive touch sensor 302 can be integrated into the display construct 202, rather than being a stand-alone module. Still other configurations of capacitive touch sensor 302, where included, will be obvious to those of ordinary skill in the art having the benefit of this disclosure.

Beneath the capacitive touch sensor 302, where included, is the display construct 202. This will be described in more detail below with reference to FIG. 4. One or more layers of adhesive 303,304 can optionally be used to couple the various components shown in FIG. 2 together in one or more embodiments. An optional backlight 305 can be included where the display device 108 is to operate in a transmissive mode. For example, when the switchable mirror of the display construct 202 is switched to the pellucid state, in one embodiment the backlight 305 can project light through pixels of the liquid crystal layer in low light environments.

A substrate 306 may be disposed beneath the display construct 202. The substrate 306, which may be a rigid or flexible printed circuit board in one or more embodiments, accommodates the various electronic circuitry of the electronic device 100. For example, the one or more processors 208, the display driver 205, a capacitive sensor circuit, and other components can be included in the electronic circuitry and disposed along the substrate 306. Each of the various layers is then disposed within a housing 301 of the electronic device 100.

It should be stated that the various elements of the electronic device 100 shown in FIG. 3 are illustrative only, and that other configurations will be obvious to those of ordinary skill in the art having the benefit of this disclosure. For example, some configurations will include a capacitive touch sensor 302, while others will not. Additional layers or fewer layers can be included without departing from the spirit and scope of this disclosure. For example, in some embodiments the electronic device 100 will include an optional haptic layer to provide a pseudo-tactile feedback in response to user actuation of virtual buttons, user actuation targets, or user input controls presented on the display device 108 to simulate conventional physical keys by delivering a tactile response to the body of the electronic device.

Figure 4:
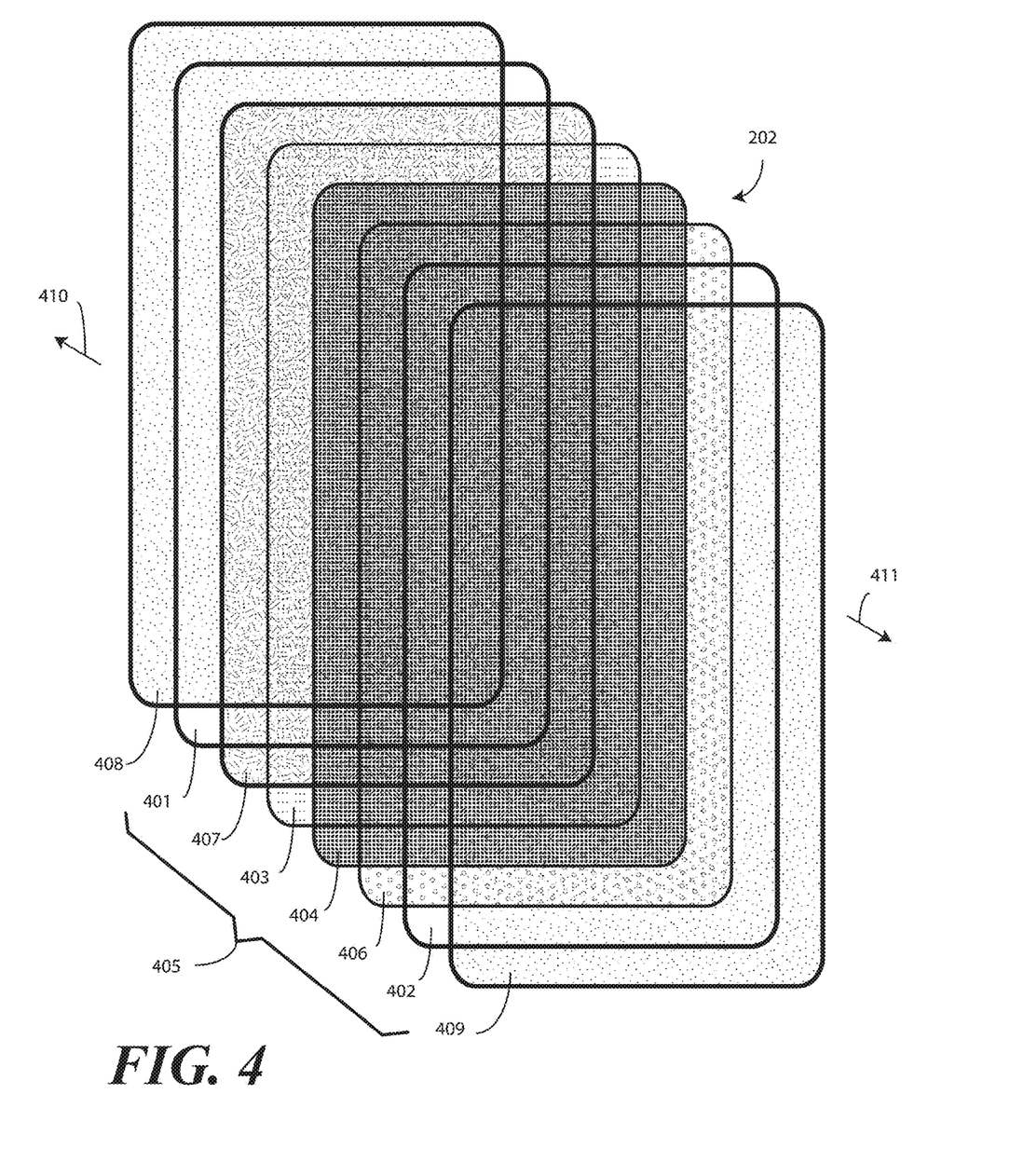
FIG. 4 illustrates an exploded view of one explanatory display construct in accordance with one or more embodiments of the disclosure.

Turning now to FIG. 4, illustrated therein is one explanatory display construct 202 suitable for use with a display device (108) configured in accordance with one or more embodiments of the disclosure. As noted above, in one or more embodiments the various elements of the display construct 202 will be constructed as a unitary, singular device, with a first substrate 401 and a second substrate 402 defining a front major face and a rear major face, respectively, of the display construct 202. This allows a single component to be placed beneath a fascia (201), or to optionally serve as the fascia itself, for an electronic device. This is in contrast to prior art designs where several separate components were stacked together to form a display assembly.

In one embodiment, the display construct 202 comprises a liquid crystal display 405 operable to selectively transmit light. To wit, in one embodiment the liquid crystal display 405 includes a liquid crystal layer 403 is disposed between a first substrate 401 and a second substrate 402. A thin film transistor circuit layer 404 can be configured to control individual pixels of the liquid crystal layer 403 in response to control signals from the one or more processors (208) and/or the display driver (205).

The liquid crystal layer 403 can be configured to operate in various different modes, and can be manufactured using different technologies. For example, in one embodiment the liquid crystal layer 403 comprises a twisted nematic display. In another embodiment, the liquid crystal layer 403 comprises an in-plane switching display. In another embodiment, the liquid crystal layer 403 comprises a vertical alignment display. In yet another embodiment, the liquid crystal layer 403 comprises an electrically controlled birefringence display. Other display technologies suitable for the liquid crystal layer 403 will be obvious to those of ordinary skill in the art having the benefit of this disclosure.

In one or more embodiments, the first substrate 401 and the second substrate 402 are manufactured from reinforced glass. However, in other embodiments, another rigid material such as a polymer or reinforced plastic may be used. Other materials suitable for use as the first substrate 401 and the second substrate 402 will be obvious to those of ordinary skill in the art having the benefit of this disclosure.

In traditional constructs, the thin film transistor circuit layer 404 is disposed along the second substrate 402. For example, the first substrate 401 can be configured as a transparent substrate that is tied electrically to ground or a common node by a layer of transparent electrode material (not shown) such as solid indium-tin oxide ($In_2O_3$ $SnO_2$) disposed along the first substrate 401. Indium tin oxide is substantially transparent and conductive, and is capable of being deposited in thin layers by way of a printing process. Indium tin oxide offers a combination of electrical conduction properties and optical transparency. When an electric field is applied to electrodes of the thin film transistor circuit layer 404, individual pixels of the liquid crystal layer 403 can be partially or completely turned ON or OFF to present graphical information to a user. In addition to electrodes, the thin film transistor circuit layer 404 can include other components, such as capacitors and other components. These other components can be manufactured from metal rather than indium tin oxide in one or more embodiments.

In this illustrative embodiment, however, the display construct 202 also includes a switchable mirror 406 that is also disposed between the first substrate 401 and the second substrate 402. In one or more embodiments, the switchable mirror 406 is operable to switch from a pellucid state to a reflective state in response to control signals from the one or more processors (208) and/or the display driver (205).

The inclusion of the switchable mirror 406 allows for the thin film transistor circuit layer 404 to be moved from the second substrate 402 to other locations within the display construct. In this illustrative example, the switchable mirror 406 is attached to the second substrate 402. The thin film transistor circuit layer 404 is then transferred from the second substrate 402 to the top of the switchable mirror 406.

Illustrating by example, in one embodiment the thin film transistor circuit layer 404 can be manufactured on a substrate, lifted from the substrate, and transferred to the top of the switchable mirror 406. Accordingly, in one embodiment, the thin film transistor circuit layer 404 is disposed along a surface of the switchable mirror 406 as shown in FIG. 4. However, embodiments of the disclosure are not so limited. In another embodiment, the switchable mirror 406 and the thin film transistor circuit layer 404 are disposed along a common substrate, e.g., the second substrate 402. The switchable mirror 406 can, for example, be integrated into the open aperture of the pixels of the liquid crystal layer 403. Other constructs will be obvious to those of ordinary skill in the art having the benefit of this disclosure.

The switchable mirror 406 can take any number of forms. Illustrating by example, in one embodiment the switchable mirror comprises an electrically switchable, transreflective mirror configured as a solid-state, thin film device comprising a liquid crystal layer configured to switch, in response to control signals from the one or more processors (208) and/or the display driver (205), between one or more reflective states. In one state, the liquid crystal material is pellucid. In another, the state is reflective. In some embodiments, partially reflective states can be achieved as well. Such switchable mirrors are manufactured, for example, by Kent Optronics under the e-TransFlector.Sup™ trade name.

In another embodiment, the switchable mirror 406 can comprise a cholesteric filter that is switchable from a pellucid state to a reflective state. In one embodiment, the cholesteric filter comprises a layer of cholesteric material that can be switched to change a polarization of light. A quarter wave plate can used with the cholesteric material such that the cholesteric material is transmissive for one direction of circular polarized light and reflective for the opposite direction of circular polarized light.

In yet another embodiment, the switchable mirror 406 can comprise an electrochromic film, such as one manufactured from a nickel-magnesium alloy, with an electrolyte layer disposed thereon. Switches can activate the electrolyte layer to change the optical properties of the switchable mirror between a pellucid state and a reflecting state. The electrochromic material is in its reflecting state when there is no voltage applied to it. By contrast, the electrochromic material can transition to a pellucid state when a voltage is applied by the one or more processors (208) and/or the display driver (205).

While these options for a switchable mirror 406 are some technologies suitable for use with one or more embodiments of the disclosure, others will be obvious to those of ordinary skill in the art, as many different switchable mirror technologies are currently, and have been recently, developed. Some use hydrogen-induced phase transitions in rare earth metals. Others use metal-based switchable mirrors capable of state transition, such as those manufactured from thin films of an active transition metal material that switch reversibly between reflecting and transparent states by application of an electric current. These types of devices are also known as electrochromic devices.

It should also be noted that despite the fact that the term switchable "mirror" is used to describe the device that can transition between a pellucid state and a reflective state, the switchable mirror 406 need not necessarily be a perfect mirror, i.e., shiny and purely reflective like a traditional glass mirror with silver film. To the contrary, in one or more embodiments, the switchable mirror 406 comprises a device that is non-shiny but that still reflects light when in the reflective state. For example, in one embodiment a diffusive device such as an electrophoretic device can be sufficiently reflective as to serve as the switchable mirror 406. In other embodiments, the switchable mirror 406 may be shiny, but may have optical features, such as dimples, or patterned textures, that diffuse light when reflecting. Accordingly, the switchable mirror 406 in one or more embodiments is a device where the transmittance and reflectance can be adjusted electronically between a pellucid state and a reflecting state. As noted, the switchable mirror 406, when in the reflective state, can be shiny, diffuse, shiny with mechanical micro structures to diffuse the light, or other types of reflective surfaces.

Regardless of the type of technology used for the switchable mirror 406, in one or more embodiments of the disclosure color "wash out" associated with prior art transreflective displays is obviated by placing the switchable mirror 406 between the first substrate 401 and the second substrate 402 of the liquid crystal display 405. In one or more embodiments, color washout is further prevented by also including a color filter 407 between the first substrate 401 and the second substrate 402, as shown in FIG. 4. In this illustrative embodiment, the liquid crystal layer 403 disposed between the color filter 407 and the switchable mirror 406. Said differently, in this illustrative embodiment the liquid crystal layer 403 is disposed between the color filter 407 and the thin film transistor circuit layer 404, while the thin film transistor circuit layer 404 is disposed between the liquid crystal layer 403 and the switchable mirror 406. Placing both the color filter 407 and the switchable mirror 406 between the first substrate 401 and the second substrate 402 reduces the distance therebetween. As will be shown in more detail with reference to FIG. 8 below, advantageously, this configuration helps to ensure that the switchable mirror 406 is operable to, when in the reflective state, reflect light through a selfsame colored pixel from which the light was received. In one embodiment, the color filter 407 and the switchable mirror 406 are separated by a distance less than fifty microns.

In one or more embodiments, a first polarizer 408 is disposed on one side of the display construct 202 to polarize incident light. In this illustrative embodiment, the first polarizer 408 is disposed along the outer surface of the first substrate 401. Similarly, a second polarizer 409 can be disposed on the opposite side of the display construct 202 to polarize light as well. Such polarizers are commonly used with traditional liquid crystal display devices and will not be explained in more detail. In the illustrative embodiment of FIG. 4, the first polarizer 408 is disposed on a first side 410 of the first substrate 401, opposite the liquid crystal layer 403, while the second polarizer 409 is disposed on a second side 411 of the second substrate opposite the liquid crystal layer 403. In this configuration, both the color filter 407 and the switchable mirror 406 are not only disposed between the first substrate 401 and the second substrate 402, but are also disposed between the first polarizer 408 and the second polarizer 409 as well. This arrangement helps to ensure color integrity when operating in the reflective mode as noted below.

It should be noted that in the illustrative embodiment of FIG. 4, where the first substrate 401 and the second substrate 402 are manufactured from glass, they define "major" substrates for the overall display construct 202 because they constitute, by far, the thickest portions of the overall structure. Illustrating by example, while the first substrate 401 and the second substrate 402 may be on the order of 0.250 millimeters thick, the first polarizer 408 and the second polarizer 409, each of which may be deposited on the first substrate 401 and the second substrate 402, respectively, may only be 140-180 microns in thickness. The liquid crystal layer 403 may be on the order of ten angstroms thick, while the thin film transistor circuit layer 404 may be only 100 microns thick. The switchable mirror 406 may be only ten microns thick. These dimensions are illustrative only, as others will be obvious to those of ordinary skill in the art having the benefit of this disclosure. Additionally, these dimensions may change—or become reduced—as the state of the art advances.

While intermediate substrates such as films can be used between the first substrate 401 and the second substrate 402 as will be described below with reference to FIG. 6, in one or more embodiments the first substrate 401 and the second substrate 402 comprise the only rigid substrates of the display construct 202. Accordingly, with reference to rigid substrates, in one or more embodiments the display construct 202 consists essentially of only the first substrate 401 and the second substrate 402. Such is the case in the embodiment of FIG. 4.

Figure 5:
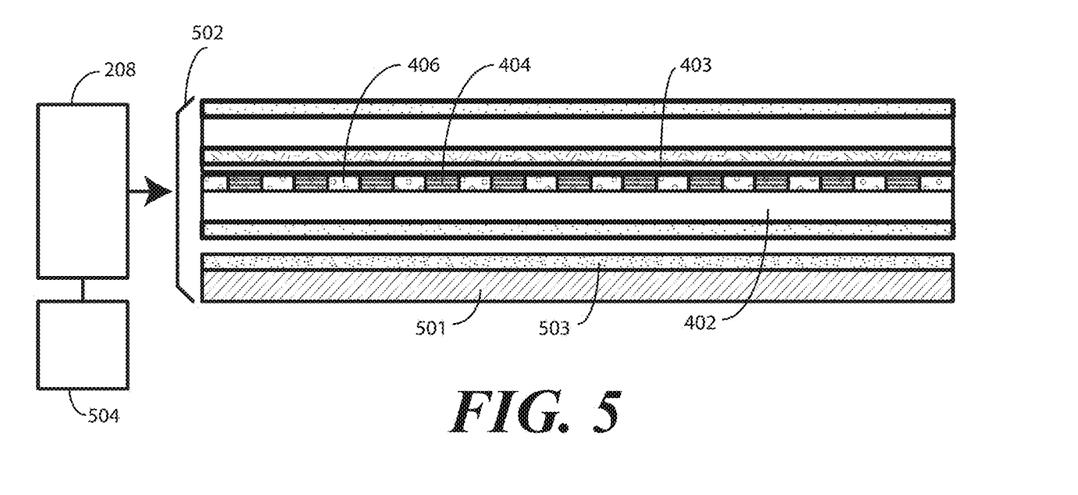
FIG. 5 illustrates a sectional view of one explanatory user interface employing one display construct in accordance with one or more embodiments of the disclosure.

Turning now to FIG. 5, illustrated therein is a sectional view of another display construct 502 in accordance with one or more embodiments of the disclosure. The display construct 502 is similar to the display construct (202) of FIG. 4. However, rather than the thin film transistor circuit layer 404 being disposed along a surface of the switchable mirror 406, as was the case in the embodiment of FIG. 4, in the display construct 502 of FIG. 5 both the thin film transistor circuit layer 404 and the switchable mirror 406 are disposed along the second substrate 402. This can be accomplished when switchable mirror material is integrated into the open aperture of the pixel area of each pixel of the liquid crystal layer 403. Thus, in this embodiment the thin film transistor circuit layer 404 and the switchable mirror 406 are disposed along a common glass substrate, i.e., second substrate 402.

In addition to the display construct 502, in the view of FIG. 5 the one or more processors 208 are present to control both the switchable mirror 406 and the liquid crystal layer 403. Additionally, a backlight 501 is provided to transmit light through the display construct 502, and in particular the switchable mirror 406, when the switchable mirror 406 is in the pellucid state.

In one embodiment, the backlight 501 comprises an electroluminescent device to provide a backlighting function to the display construct 502 when it is operating in the transmissive mode. As used herein, "electroluminescent" refers to any device capable of producing luminescence electrically, including light emitting diodes, and equivalent devices. Such a function is useful in improving the visibility of overall display in low-light conditions. In one embodiment, the electroluminescent device includes a layer of backlight material sandwiched between a transparent substrate. In one or more embodiments, a layer of translucent adhesive 503 can optionally couple the backlight 501 to the display construct 502. In other embodiments, the layer of translucent adhesive 503 will be omitted.

A light sensor 504 is also included with the embodiment of FIG. 5. In one embodiment, the light sensor 504 is operable with the one or more processors 208 to sense light incident on the display construct 502, the electronic device (100), or combinations thereof. In one embodiment, the light sensor 504 is operable to detect changes in optical intensity, color, light, or shadow in the environment of an electronic device (100). Signals corresponding to these changes, received from the light sensor 504 by the one or more processors 208, can be used to control the operation of the switchable mirror 406, the backlight 501, or both. For example, where the light sensor 504 indicates that the electronic device (100) is in full sunlight, the one or more processors 208 can cause the switchable mirror 406 to transition from the pellucid state to the reflective state, and optionally turn OFF the backlight 501, to make the resulting display more visible and to conserve power.

The opposite can be true when the light sensor 504 determines that the electronic device (100) is in ambient or low-light conditions. The one or more processors 208 may transition the switchable mirror 406 to the pellucid state and actuate the backlight 501. Accordingly, in one or more embodiments, the one or more processors 208 are operable to switch the switchable mirror 406 from the pellucid state to the reflective state when an amount of light received by the light sensor 504 exceeds a predefined threshold. Moreover, in one or more embodiments the one or more processors 208 are operable to turn OFF the backlight—or switch it to a low-power mode of operation—when the switchable mirror 406 is in the reflective state. It should be noted that while the light sensor 504 is shown in FIG. 5, it could be incorporated in the same manner to any of the embodiments of the disclosure.

Figure 6:
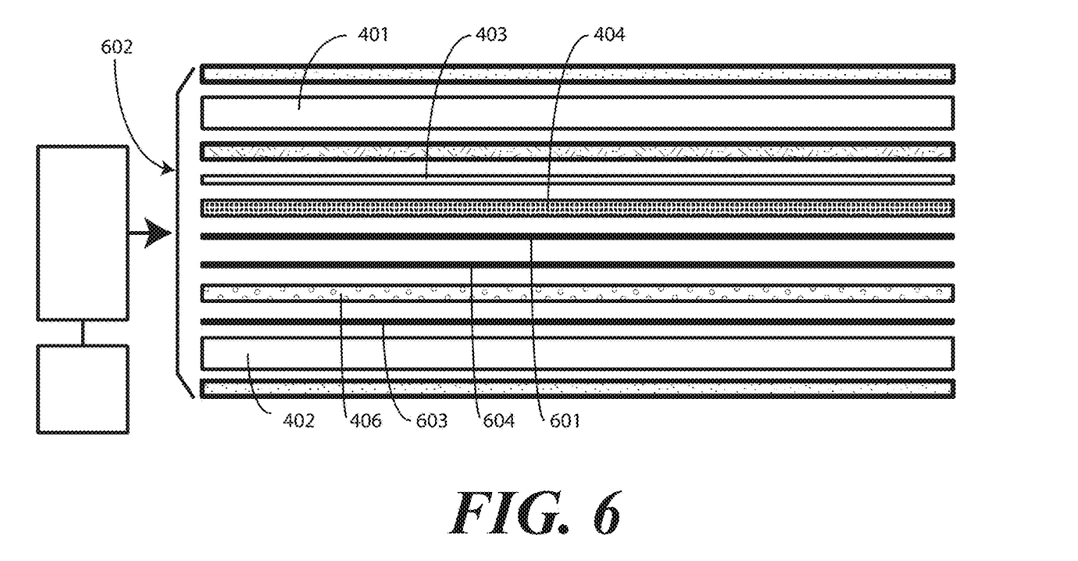
FIG. 6 illustrates a sectional, exploded view of another explanatory user interface employing another display construct in accordance with one or more embodiments of the disclosure.

Turning now to FIG. 6, illustrated therein is yet another display construct 602, shown in exploded view, in accordance with one or more embodiments of the disclosure. Recall from the discussion of FIG. 4 that while in one or more embodiments a display construct (202,502) consists essentially of only the first substrate 401 and the second substrate 402, as was the case in FIGS. 4 and 5, in some embodiments intermediate substrates such as films can be used between the first substrate 401 and the second substrate 402. Such is the case in FIG. 6.

In the illustrative embodiment of FIG. 6, the thin film transistor circuit layer 404 is disposed along a thin film substrate 601. Similarly, the switchable mirror 406 is disposed between two thin film substrates 604,603. These thin film substrates 601,604,603 can provide separation, for example, between electrical components, electrodes, and other devices controlling the operation of the liquid crystal layer 403 and the switchable mirror 406. Accordingly, in one or more embodiments, at least one intermediate substrate is disposed between the thin film transistor circuit layer 404 and the switchable mirror 406.

Since the thickness of these thin film substrates 601,604, 603 are very small in comparison to that of the glass substrates, i.e., the first substrate 401 and the second substrate 402, they are referred to as mirror substrates while the first substrate 401 and the second substrate are referred to as major substrates. Accordingly, in one or more embodiments the display construct 602 consists essentially of only a first major substrate and a second major substrate, despite including mirror substrates, since the mirror substrates do not affect the operation of the major substrates.

Figure 7:
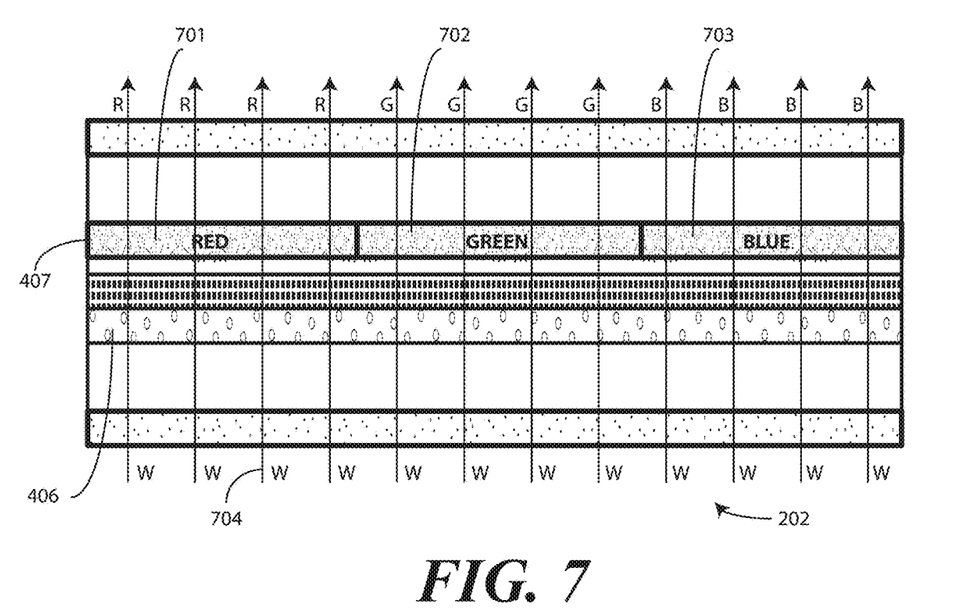
FIG. 7 illustrates one explanatory display in accordance with one or more embodiments of the disclosure operating in a transmissive mode with a switchable mirror operating in a pellucid state.

Turning now to FIG. 7, illustrated therein is a sectional view of one pixel of a device construct 202 configured in accordance with one or more embodiments of the disclosure. As shown in FIG. 7, in this illustrative embodiment the color filter 407 defines a plurality of colored pixel filters 701,702, 703. For example, in one embodiment, each pixel of the color filter 407 includes a red pixel filter 701, a green pixel filter 702, and a blue pixel filter 703.

In the embodiment of FIG. 7, the switchable mirror 406 is in the pellucid state. Accordingly, light 704 from a light source such as a backlight (501) passes through the color filter 407 as red, green, or blue light. The one or more processors (208) can control whether the pixel looks red, green, or blue, or combinations thereof, by controlling the liquid crystal layer 403 to determine how much of the light 704 passes through each of the red pixel filter 701, the green pixel filter 702, and the blue pixel filter 703, respectively.

Figure 8:
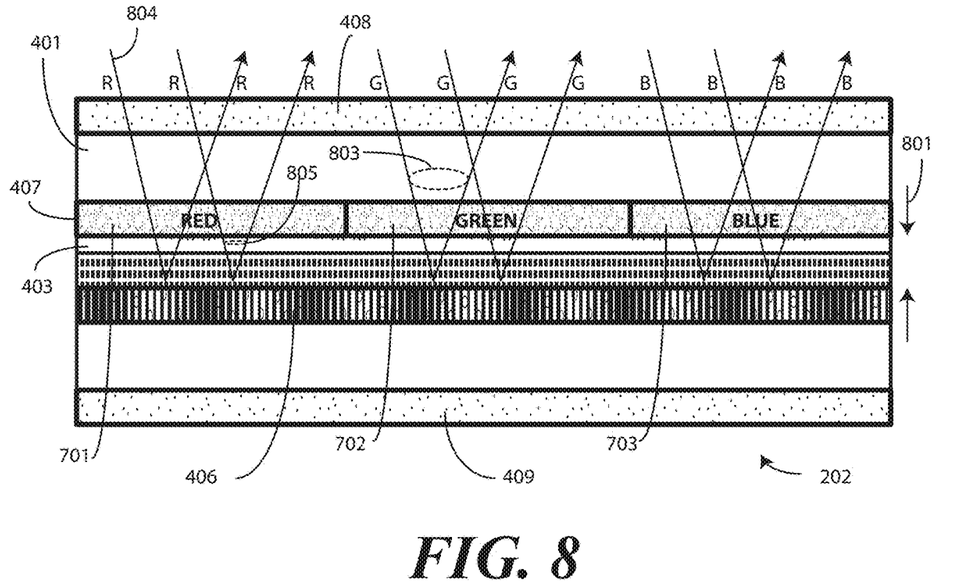
FIG. 8 illustrates one explanatory display in accordance with one or more embodiments of the disclosure operating in a reflective mode with a switchable mirror operating in a reflective state.
Figure 9:
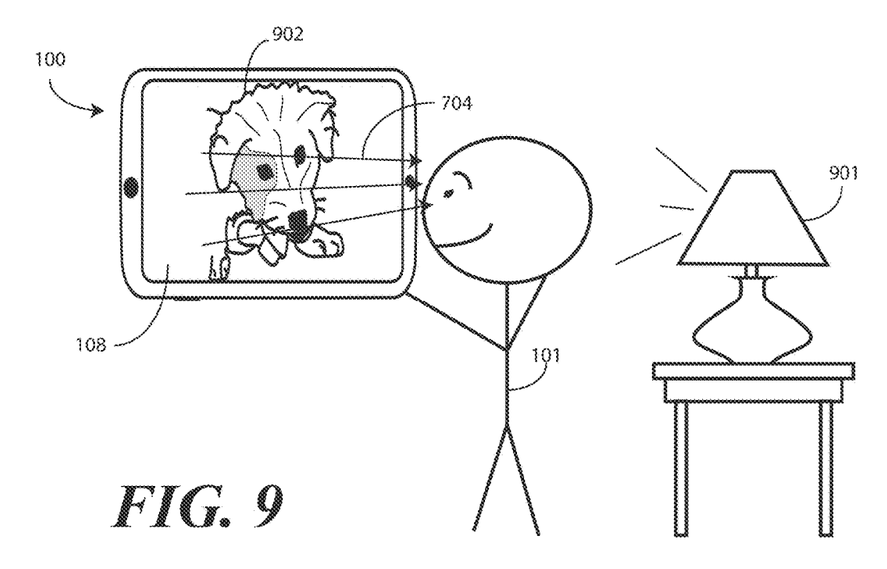
FIG. 9 illustrates one explanatory display in accordance with one or more embodiments of the disclosure operating in a transmissive mode with a switchable mirror operating in a pellucid state.

Turning now to FIG. 8, illustrated therein is another sectional view of one pixel of the device construct 202. Here, however, the switchable mirror 406 has been transitioned to the reflective state. Accordingly, ambient light 804 received from external light sources is reflected off the switchable mirror 406.

In one or more embodiments, when the switchable mirror 406 has been transitioned to the reflective state, since the light 804 is received through, for example, the first substrate 401, the color filter 407, and the liquid crystal layer 403, and is then reflected back through the same three layers, it can be advantageous to drive the liquid crystal layer 403 at a reduced voltage mode so that the desired polarization of incoming ambient light 804 is obtained.

Illustrating by example, when the switchable mirror 406 was operating in the pellucid state in FIG. 7, the one or more processors (208) and/or display driver (205) could drive the liquid crystal layer at one hundred percent of its operable range due to the fact that the unpolarized backlight achieves the desired polarization by passing through the liquid crystal layer 403.

By contrast, when the switchable mirror 406 is operating in the reflective state, in one or more embodiments the one or more processors (208) and/or display driver (205) are operable to drive the crystals of the liquid crystal layer 403 at approximately fifty-percent of their operable range. Optical tuning can be used to adjust the drive voltage to the optimal amount above or below the fifty-percent starting point. Accordingly, the ambient light 804 enters the display construct 202 in an unpolarized state and achieves fifty percent of its desired polarization as is passes through the liquid crystal layer 403 to the switchable mirror 406. The ambient light 408 is then reflected off the switchable mirror 406 and passes through the liquid crystal layer 403 again, thereby achieving another fifty percent of the desired polarization change. By driving the liquid crystal layer 403 at a reduced voltage, the display construct 202 compensates for the round trip effect through the liquid crystal layer 403 that occurs when the switchable mirror 406 is operating in the reflective state.

The view of the device construct 202 in FIG. 8 illustrates distinct advantages offered by embodiments of the disclosure over prior art designs where transflective devices are disposed outside the liquid crystal display. One primary advantage is the proximity of the color filter 407 and the switchable mirror 406. In one or more embodiments, the color filter 407 and the switchable mirror 406 are separated by a distance 801 of less than fifty microns. This allows the switchable mirror 406 to, when in the reflective state, reflect light 804 through a selfsame colored pixel from which the light 804 was received, rather than "bleeding" through to other colored pixels. For example, light 804 is received by the pixel shown in FIG. 8 through the red color pixel 701 and is reflected through the same color pixel, i.e., the red color pixel 701. As noted above, this dimension is illustrative only, and may change as advances in the technology occur.

With prior art designs, the distance between any color filter and any transflective device is so great that light received through, for example, the red color pixel 701 may be reflected through either the green color pixel 702 or the blue color pixel 703. This causes color washout due to a parallax effect created with the distance between the color filter 407 and the switchable mirror 406 becomes too great.

By contrast, with embodiments of the present disclosure, most all—if not all—light received through any one color pixel is reflected through the selfsame color pixel to preserve color integrity. This is true because, in one embodiment, both the color filter 407 and the switchable mirror 406 are disposed between the first substrate 401 and the second substrate 402. A secondary reason color integrity is preserved is due to the fact that both the color filter 407 and the switchable mirror 406 are disposed between the first polarizer 408 and the second polarizer 409.

One way to understand this is to consider the fact that light 804 only passes through the first substrate 401 when that light 804 is incident to the first substrate at an angle of incidence that is greater than a predefined minimum angle of incidence 802 at which it would be absorbed or reflected. Accordingly, light 804 is received within an optic cone 803 defined by this predefined minimum angle of incidence 802. In the embodiment of FIG. 8, the distance 801 between the color filter 407 and the switchable mirror 406 is small enough that a conic section 805 taken at any one of the colored pixel filters 701,702,703 is less than the area of the colored pixel filter 701,702,703 itself. Accordingly, the light 804 reflects through a selfsame colored pixel from which it was received as shown in FIG. 8.

As noted above, the liquid crystal layer 403 can be any of a twisted nematic display, electrically controlled birefringence display, or a vertical alignment display. Advantageously, embodiments of the disclosure also work with an in-plane switching display due to the fact that the switchable mirror 406 and the color filter 407 are disposed within in the display construct 202, and therefore are in close proximity to each other. This is one significant advantage because, in a traditional transflective displays, transmission and reflection of light occurs within the same sub-pixel. This results in complicity and difficulty in using an in-plane switching display because different voltages are required at the transmission and reflection regions. By contrast, embodiments of the disclosure work with in-plane switching technologies, thereby allowing both transmissive and reflective displays in conjunction with the superior optical performance on an off axis offered by in-plane switching displays.

Advantageously, embodiments of the disclosure allow electronic devices employing display constructs configured in accordance with one or more embodiments of the disclosure to be used in low or ambient light conditions—or alternatively in bright light conditions—without compromising display visibility or color integrity. Illustrating by example, turning now to FIG. 9, a user 101 is indoors using an electronic device 100 with ambient lighting conditions provided by a table lamp 901. In this embodiment, the display device 108 is operating in a transmissive mode with a switchable mirror (406) switched to a pellucid state. Accordingly, light 704 from a backlight (501) or other electroluminescent device passes through the display device 108 to the user's eyes. Accordingly, the user 101 is able to look at a picture of his dog, Buster 902, clearly and with precise color integrity.

Figure 10:
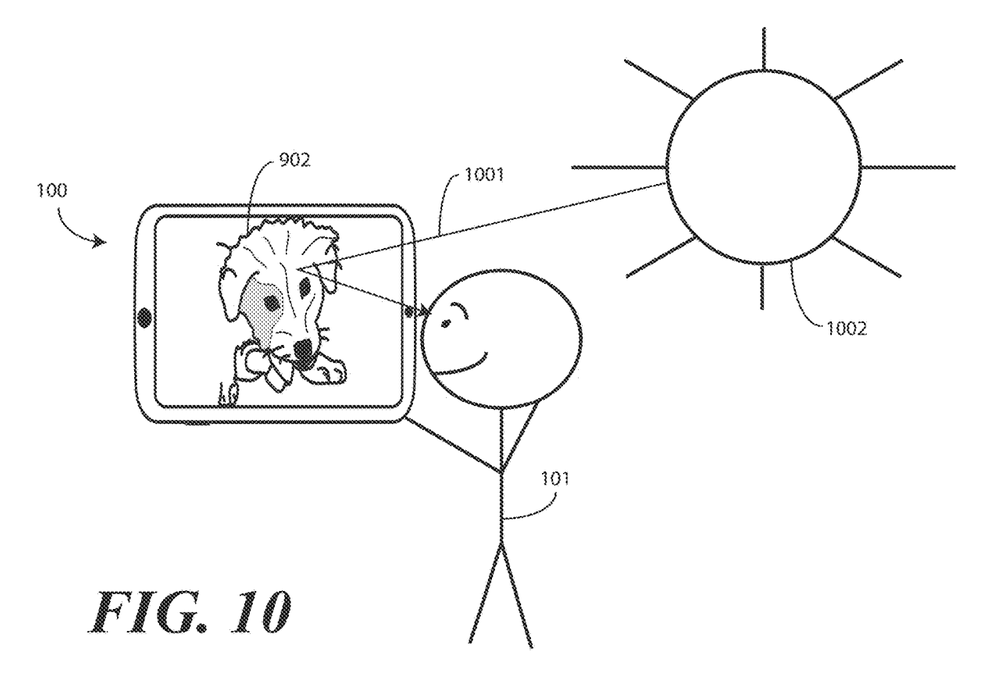
FIG. 10 illustrates one explanatory display in accordance with one or more embodiments of the disclosure operating in a reflective mode with a switchable mirror operating in a reflective state.

By contrast, in FIG. 10 the user 101 is using the electronic device 100 outdoors with in full sun. Accordingly, the one or more processors (208) of the electronic device 100, optionally working in tandem with a light sensor (504), has transitioned the switchable mirror (406) to the reflective state. Accordingly, light 1001 from the sun 1002 reflects off the switchable mirror (406), thereby allowing the user 101 \ to look at a picture of his dog, Buster 902, clearly and with precise color integrity.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A display device, comprising:
 a liquid crystal display, operable to selectively transmit light;
 a switchable mirror, operable to switch from a pellucid state to a reflective state; and
 a thin film circuit layer;
 the liquid crystal display comprising a liquid crystal layer disposed between a first substrate and a second substrate, wherein the first substrate and the second substrate comprise the only rigid substrates of the display device;
 wherein the switchable mirror is also disposed between the first substrate and the second substrate and is attached to the second substrate;
 the thin film transistor circuit layer disposed along a surface of the switchable mirror such that the switchable mirror is between the thin film transistor circuit layer and the second substrate.

2. The display device of claim 1, further comprising a color filter disposed between the first substrate and the second substrate.

3. The display device of claim 2, the liquid crystal layer disposed between the color filter and the switchable mirror.

4. The display device of claim 3, the color filter defining a plurality of colored pixel filters.

5. The display device of claim 4, the switchable mirror operable to, when in the reflective state, reflect light through a selfsame colored pixel from which the light was received.

6. The display device of claim 4, the first substrate to transmit light within an optic cone defined by a predefined minimum angle of incidence at which the first substrate will transmit the light, wherein an area of a conic section of the optic cone taken at any one colored pixel filter is less than another area of the any one colored pixel filter.

7. The display device of claim 6, wherein the color filter and the switchable mirror are separated by a distance less than fifty microns.

8. The display device of claim 3, the thin film transistor circuit layer operable to control the liquid crystal layer.

9. The display of claim 8, the thin film transistor transferred from a third substrate to a top of the switchable mirror.

10. The display device of claim 8, further comprising one or more processors, the one or more processors controlling the liquid crystal layer to determine how much of the light passes through the color filter.

11. The display device of claim 10, wherein the one or more processors control the liquid crystal layer to determine how much of the light passes through the color filter when the switchable mirror is in the pellucid state.

12. The display device of claim 1, further comprising a light sensor and one or more processors, the one or more processors operable to switch the switchable mirror from the pellucid state to the reflective state when an amount of light received by the light sensor exceeds a predefined threshold.

13. The display device of claim 1, further comprising a backlight to transmit light through the switchable mirror when in the pellucid state.

14. The display device of claim 13, further comprising one or more processors to turn OFF the backlight when the switchable mirror is in the reflective state.

15. The display device of claim 1, further comprising a first polarizer and a second polarizer, the first polarizer disposed on a first side of the first substrate opposite the liquid crystal layer, the second polarizer disposed on a second side of the second substrate opposite the liquid crystal layer.

16. An electronic device, comprising:
 one or more processors; and
 a display, operable with the one or more processors, the display comprising:
  one or more substrates consisting essentially of a first glass substrate and a second glass substrate;
  a liquid crystal layer;
  a color filter;
  a thin film transistor circuit layer; and
  a switchable mirror, operable with the one or more processors to selectively transition between a pellucid state and a reflective state;
  the switchable mirror, the thin film transistor circuit layer, the liquid crystal layer, and the color filter disposed between the first glass substrate and the second glass substrate with the liquid crystal layer disposed between the color filter and the thin film transistor circuit layer, the thin film transistor circuit layer disposed between the liquid crystal layer and the switchable mirror, and the switchable mirror disposed between the thin film transistor circuit layer and the second glass substrate.

17. The electronic device of claim 16, the thin film transistor circuit layer to control the liquid crystal layer.

18. The electronic device of claim 16, further comprising a light sensor, the switchable mirror switching from the pellucid state to the reflective state when the light sensor indicates the electronic device is in full sunlight.

* * * * *